(12) United States Patent
Heath et al.

(10) Patent No.: US 7,267,300 B2
(45) Date of Patent: Sep. 11, 2007

(54) AIRCRAFT CAPABLE OF VERTICAL AND SHORT TAKE-OFF AND LANDING

(75) Inventors: Gregory F. Heath, Mesa, AZ (US); Ronald E. Gilbert, Payson, AZ (US); Terrell W. Hansen, Mesa, AZ (US); Stephen C. Slaughter, Scottsdale, AZ (US)

(73) Assignee: The Boeing Company, Chicago, IL (US)

(*) Notice: Subject to any disclaimer, the term of this patent is extended or adjusted under 35 U.S.C. 154(b) by 156 days.

(21) Appl. No.: 11/065,855

(22) Filed: Feb. 25, 2005

(65) Prior Publication Data

US 2006/0192046 A1    Aug. 31, 2006

(51) Int. Cl.
*B64C 15/02* (2006.01)
(52) U.S. Cl. .................................................. 244/12.3
(58) Field of Classification Search ..... 244/12.1–23 D, 244/23 R
See application file for complete search history.

(56) References Cited

U.S. PATENT DOCUMENTS

| | | | | |
|---|---|---|---|---|
| 1,652,554 A | * | 12/1927 | Bolgiano | 244/6 |
| 1,662,406 A | * | 3/1928 | Thompson | 244/6 |
| 1,667,002 A | * | 4/1928 | Hall | 244/5 |
| 1,783,458 A | * | 12/1930 | Windsor | 244/6 |
| 2,481,799 A | * | 9/1949 | Tuttle | 244/22 |
| 2,926,868 A | * | 3/1960 | Taylor | 244/12.4 |
| 3,056,565 A | * | 10/1962 | Griffith | 244/12.3 |
| 3,082,977 A | * | 3/1963 | Arlin | 244/17.23 |
| 3,120,362 A | * | 2/1964 | Curtis et al. | 244/52 |
| 3,139,244 A | * | 6/1964 | Bright | 244/12.3 |
| 3,170,530 A | * | 2/1965 | Black | 180/119 |
| 3,179,353 A | * | 4/1965 | Peterson | 244/12.3 |
| 3,212,731 A | * | 10/1965 | Kappus | 244/12.5 |
| 3,291,242 A | * | 12/1966 | Tinajero | 180/116 |
| 3,335,977 A | * | 8/1967 | Meditz | 244/12.4 |
| 3,387,456 A | * | 6/1968 | Feder et al. | 60/204 |
| 3,388,878 A | * | 6/1968 | Peterson et al. | 244/23 B |
| 3,559,921 A | * | 2/1971 | Timperman | 244/12.3 |
| 3,856,238 A | * | 12/1974 | Malvestuto, Jr. | 244/5 |
| 3,933,325 A | * | 1/1976 | Kaelin | 244/23 C |
| 3,972,490 A | * | 8/1976 | Zimmermann et al. | 244/12.3 |
| 4,125,232 A | * | 11/1978 | MacLean et al. | 244/12.3 |
| 4,161,843 A | * | 7/1979 | Hui | 446/37 |
| 4,469,294 A | * | 9/1984 | Clifton | 244/12.3 |
| 4,757,962 A | * | 7/1988 | Grant | 244/12.3 |
| 4,799,629 A | * | 1/1989 | Mori | 244/23 C |
| 4,828,203 A | * | 5/1989 | Clifton et al. | 244/12.3 |
| 4,880,071 A | * | 11/1989 | Tracy | 180/117 |
| 5,115,996 A | * | 5/1992 | Moller | 244/12.5 |
| 5,275,356 A | * | 1/1994 | Bollinger et al. | 244/12.3 |

(Continued)

*Primary Examiner*—Stephen A Holzen
(74) *Attorney, Agent, or Firm*—Lee & Hayes, PLLC

(57) ABSTRACT

Aircraft comprising an airframe having a forward end, an aft end opposite the forward end, a top extending between the forward end and the aft end, and a bottom opposite the top side. The aircraft further includes a power plant mounted on the airframe. In addition, the aircraft includes at least two propellers rotatably mounted on the airframe and powered by the power plant for moving the aircraft in a generally forward direction during operation of the propellers. Also, the aircraft includes at least two counter-rotatable fan sets mounted on the airframe and powered by the power plant for providing upward lift to the aircraft during operation of the fan sets.

10 Claims, 6 Drawing Sheets

U.S. PATENT DOCUMENTS

| | | | |
|---|---|---|---|
| 5,320,305 A * | 6/1994 | Oatway et al. | 244/12.3 |
| 5,407,150 A * | 4/1995 | Sadleir | 244/12.4 |
| 5,419,514 A * | 5/1995 | Ducan | 244/12.4 |
| 5,505,407 A * | 4/1996 | Chiappetta | 244/2 |
| 5,802,918 A | 9/1998 | Chen et al. | |
| 5,823,470 A | 10/1998 | Craig et al. | |
| 5,823,857 A | 10/1998 | Tan | |
| 5,862,706 A | 1/1999 | Chen et al. | |
| 5,890,441 A * | 4/1999 | Swinson et al. | 244/12.3 |
| 5,895,011 A * | 4/1999 | Gubin | 244/12.1 |
| 5,941,124 A | 8/1999 | Tan | |
| 6,129,793 A | 10/2000 | Tan et al. | |
| 6,146,253 A | 11/2000 | Litvin et al. | |
| 6,254,032 B1 * | 7/2001 | Bucher | 244/12.2 |
| 6,340,133 B1 * | 1/2002 | Capanna | 244/6 |
| 6,467,726 B1 * | 10/2002 | Hosoda | 244/60 |
| 6,561,456 B1 * | 5/2003 | Devine | 244/12.1 |
| 6,565,038 B2 * | 5/2003 | Papandreadis | 244/12.2 |
| 6,602,115 B2 | 8/2003 | Tan | |
| 6,629,670 B1 * | 10/2003 | Shah | 244/12.3 |
| 6,732,972 B2 * | 5/2004 | Malvestuto, Jr. | 244/12.3 |
| 6,808,140 B2 * | 10/2004 | Moller | 244/12.5 |
| 6,843,447 B2 * | 1/2005 | Morgan | 244/12.3 |
| 6,860,449 B1 * | 3/2005 | Chen | 244/12.1 |
| 6,883,748 B2 * | 4/2005 | Yoeli | 244/12.3 |
| 7,032,861 B2 * | 4/2006 | Sanders et al. | 244/23 A |
| 2003/0106959 A1 * | 6/2003 | Fukuyama | 244/23 R |
| 2006/0113426 A1 * | 6/2006 | Yoeli | 244/23 A |
| 2006/0151666 A1 * | 7/2006 | VanderMey et al. | 244/12.3 |
| 2006/0192046 A1 * | 8/2006 | Heath et al. | 244/12.3 |
| 2006/0226281 A1 * | 10/2006 | Walton | 244/17.23 |

\* cited by examiner

AIRCRAFT CAPABLE OF VERTICAL AND SHORT TAKE-OFF AND LANDING

BACKGROUND OF THE INVENTION

The present invention relates to aircraft capable of vertical take-off and landing and, more particularly, to aircraft capable of such maneuvers using split-torque face gear drives.

Aircraft designed to allow vertical and short take-off and landing, hover, full forward, and transitional flight have existed since about the middle of the twentieth century. These vehicles are often referred to as dual mode or V/STOL aircraft because of their vertical and/or short take-off and landing capabilities. There are four primary types of V/STOL vehicles: those having a single power plant for horizontal and vertical thrust; those having separate power plants for horizontal and vertical thrust; combined systems having separate power plants for horizontal and vertical thrust and a supplemental power plant to assist vertical propulsion; and augmented systems having an auxiliary vertical propulsion device powered by the primary propulsion device(s).

Numerous disadvantages of conventional V/STOL vehicles have kept them from more widespread and successful use. Many of these disadvantages stem from the fact that conventional designs are too complex and result in insufficient performance. The complexities associated with having multiple power plants, one or more to drive the vehicle horizontally and one or more to drive the vehicle vertically, are pronounced. An obvious shortcoming of a multiple power plant system is the weight added by and space required for the additional power plant(s). The aforementioned augmented systems require even more structure, which adds weight and takes space.

Conventional V/STOL systems using the same power plant for horizontal and vertical thrust have challenges related to the complexity of their designs. Examples of conventional single power plant designs include systems having deflector vanes in the downwash of horizontal thrusters and systems having tilting wings, thrusters, and/or power plant. The additional structure required by these systems adds excessive complexity and unwanted weight to the aircrafts.

Whether using a single power plant or multiple power plants for horizontal and vertical propulsion, conventional V/STOL systems are frequently overly complex, too heavy, and inefficient. In addition, there are many secondary weaknesses of conventional designs. For example, more complex systems generally cost more to manufacture and maintain. Also, because of added weight and, in many instances, power requirements, many conventional V/STOL vehicles have relatively short flight ranges and low fuel efficiencies. Low fuel efficiencies, in turn, result in low emissions performance, as more fuel is needed to carry the vehicle the same distance.

Other shortcomings of traditional devices include insufficient payload capacity. Poor payload capacity primarily results from a heavier base, or unloaded, vehicle. Payload characteristics also result from system design variables, such as spatial specifications. Many conventional V/STOL vehicles also exhibit poor maneuverability primarily due to their heaviness and underperforming steering and thrust systems. Finally, conventional V/STOL vehicles are frequently unreliable and sometimes experience stalling and part failure during operation. This unreliability is usually a result of the complexity, weight, and high power requirements of conventional V/STOL vehicles.

BRIEF SUMMARY OF THE INVENTION

The present invention relates to aircraft comprising an airframe having a forward end, an aft end opposite the forward end, a top extending between the forward end and the aft end, and a bottom opposite the top. The aircraft further includes at least two propellers rotatably mounted on the airframe and powered by the power plant for moving the aircraft in a generally forward direction during operation of the propellers. The aircraft also includes at least two counter-rotatable fan sets mounted on the airframe and powered by the power plant for providing upward lift to the aircraft during operation of the fan sets.

In another aspect, the present invention includes an aircraft flight control system. The flight control system has at least three counter-rotatable fan sets. Each fan set includes an upper ring face gear, a lower ring face gear, a central hub, and a plurality of blades extending inward from each upper ring face gear and lower ring face gear to the respective central hub. The flight control system further includes a first input shaft operatively connected to the upper and lower face gears of a first fan set of the fan sets for driving the face gears in opposite directions. In addition, the flight control system includes a second input shaft operatively connected to the upper and lower face gears of a second fan set of the fan sets for driving the face gears in opposite directions. The flight control system also includes a third input shaft operatively connected to the upper and lower face gears of a third fan set of the fan sets for driving the face gears in opposite directions.

In yet another aspect, the present invention includes aircraft comprising an airframe having a forward end, an aft end opposite the forward end, and a longitudinal axis extending between the forward end and the aft end. The aircraft further includes a power plant mounted on the airframe and a ducted ring fan mounted on the airframe between the forward end and the aft end for providing lift to the aircraft. In addition, the aircraft includes a fan shaft connecting the power plant to the ring fan for powering the ring fan to provide lift during use. The aircraft also includes a propeller mounted on the airframe for providing forward thrust to the aircraft and a propeller shaft connecting the power plant to the propeller for powering the propeller to provide thrust during use.

In still another aspect, the present invention includes a method for controlling aircraft flight including selectively adjusting fan blade pitch of a plurality of counter-rotating ducted wing fan sets mounted on a fuselage of the aircraft between about 0° and about 45° from a plane about which the wing fans rotate. The wing fan blade pitch adjustment is accomplished by actuating piezoelectric fibers embedded in a composite matrix that the wing fan blades are made of. The wing fan blade pitches are adjusted to control aircraft roll and vertical thrust. The method further includes selectively adjusting fan blade pitch of at least one counter-rotating ducted nose fan set mounted on the fuselage between about 0° and about 45° from a plane about which the at least one nose fan rotates. The nose fan blade pitch adjustment is accomplished by actuating piezoelectric fibers embedded in a composite matrix that the nose fan blades are made of. The nose fan blade pitches are adjusted to control aircraft pitch and vertical thrust. The method also includes selectively adjusting propeller blade pitch of a plurality of rotating propellers mounted on the fuselage between about 45° and about 0° from a plane about which the propellers rotate. The propeller blades are adjusted by actuating piezoelectric fibers embedded in a composite matrix that the propeller blades are made of. The propeller blades are adjusted to control aircraft yaw and horizontal thrust.

In yet still another aspect, the present invention includes a method for controlling aircraft flight including providing a transfer gear box operatively connecting a power plant to a plurality of counter-rotating wing fan sets and at least one counter-rotating nose fan set. The counter-rotating wing fan sets are operatively connected to a plurality of corresponding propellers. The method further includes collectively controlling the pitch of blades of the wing fan sets, the at least one nose fan set, and the propellers.

In a further aspect, the present invention includes a method for controlling aircraft flight including selectively adjusting blade pitch of a counter-rotatable ducted fan set mounted on a fuselage of the aircraft between about 0° and about 45° from a plane about which the fan set rotates. The fan blade pitch is adjusted by actuating piezoelectric fibers embedded in a composite matrix that the fan blades are made of. The method further includes selectively adjusting blade pitch of a propeller mounted on the fuselage between about 0° and about 45° from a plane about which the propeller rotates. The propeller blade pitch is adjusted by actuating piezoelectric fibers embedded in a composite matrix that the propeller blades are made of.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
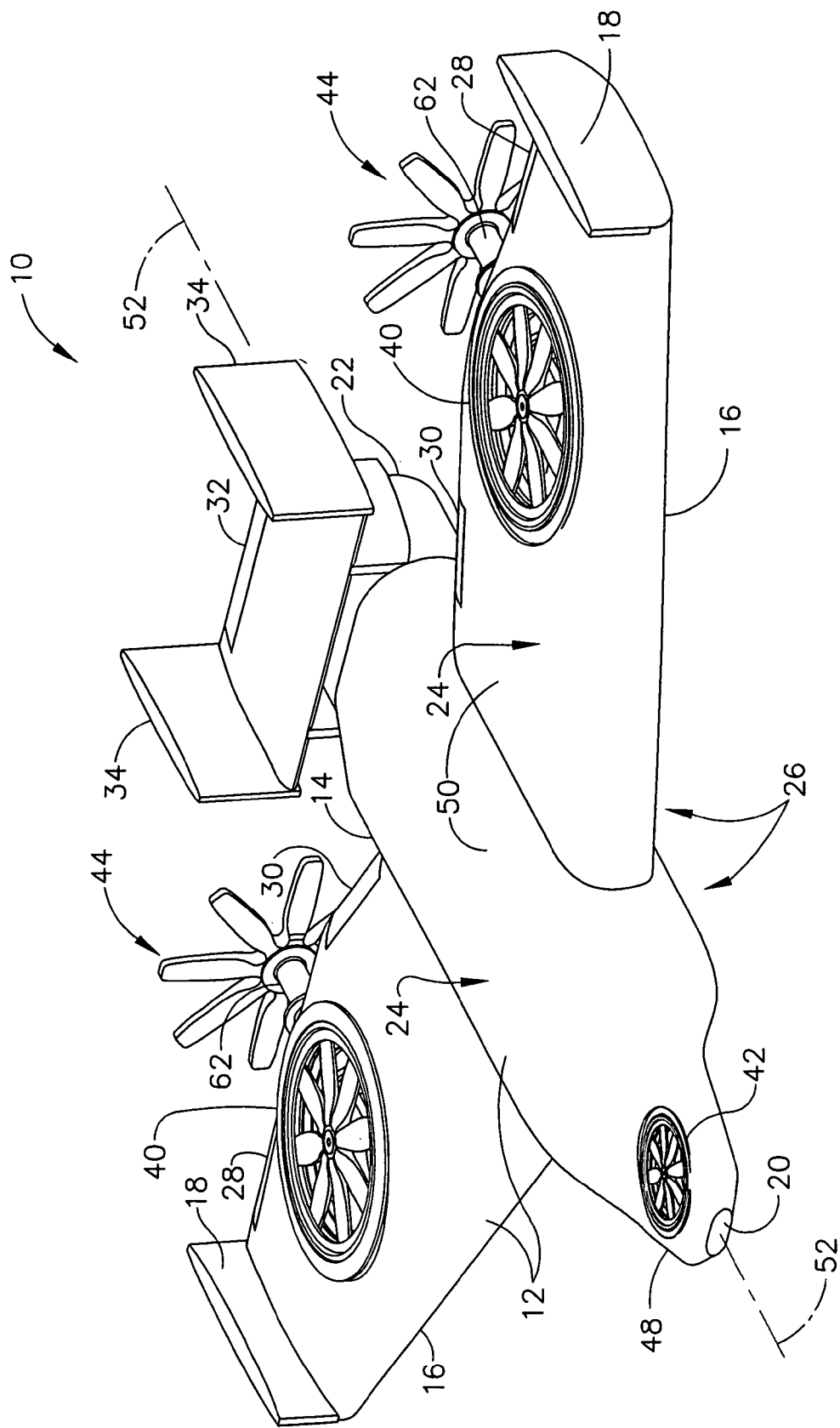
FIG. 1 is a perspective of aircraft according to the present invention.

The present invention relates to aircraft, and more particularly to aircraft capable of vertical and short runway take-off and landing. Referring now to the figures, and more particularly to FIG. 1, aircraft according to a first embodiment of the present invention is designated in its entirety by reference number 10. The aircraft 10 has an airframe 12 including a fuselage 14 and at least two wings 16 extending laterally from the fuselage to wingtips 18 at their respective outer ends. The fuselage 14 extends between a forward end 20 and an aft end 22. Although the fuselage 14 may have other lengths without departing from the scope of the present invention, in one embodiment the fuselage has a length extending between the forward end 20 and the aft end 22 of between about 5 feet and about 40 feet. Although the aircraft 10 may have other wingspans without departing from the scope of the present invention, in one embodiment the aircraft has a wingspan extending between the wingtips 18 between about 7 feet and about 56 feet. As will be appreciated by those skilled in the art, the fuselage 14 and wings 16 have a top 24 and a bottom 26. The aircraft 10 can include traditional steering components such as ailerons 28, flaps 30, one or more elevators 32, and vertical stabilizers or fins 34. The aircraft 10 can also have spoilers, slats, horizontal stabilizers, and a rudder (not shown). The aircraft 10 further includes at least two counter-rotatable ducted ring fan sets 40, 42 and at least two propellers 44 mounted on the airframe 12.

Figure 2:
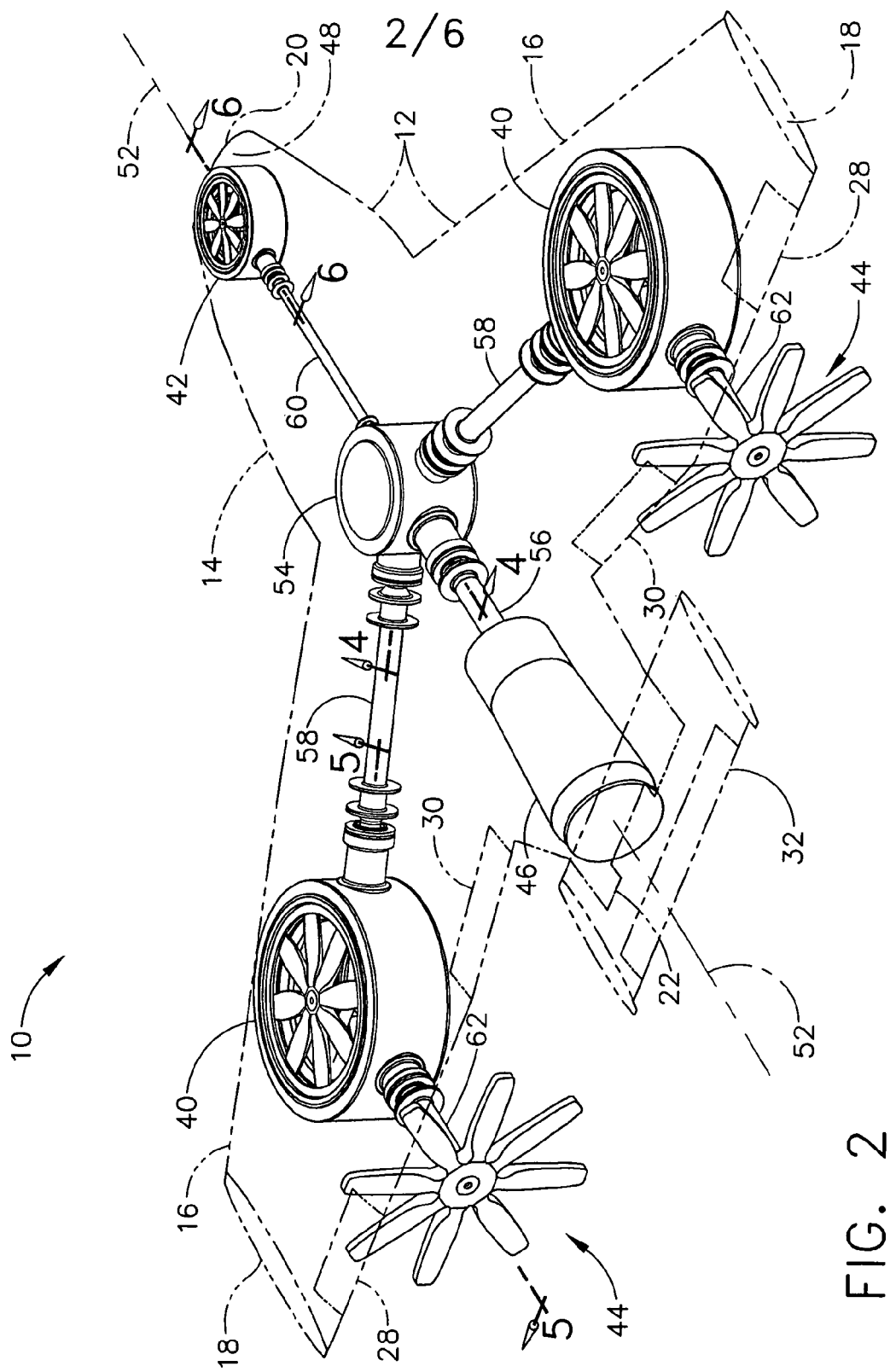
FIG. 2 is a perspective of an aircraft flight control system according to the present invention.

As shown in FIG. 2, the aircraft 10 has a power plant 46 mounted on the airframe 12 adjacent the aft end 22. The counter-rotatable fan sets 40, 42 are powered by the power plant 46 for providing upward lift to the aircraft 10 during operation of the fan sets. The propellers 44 are powered by the power plant 46 for moving the aircraft 10 in a generally forward direction during operation of the propellers.

Figure 5:
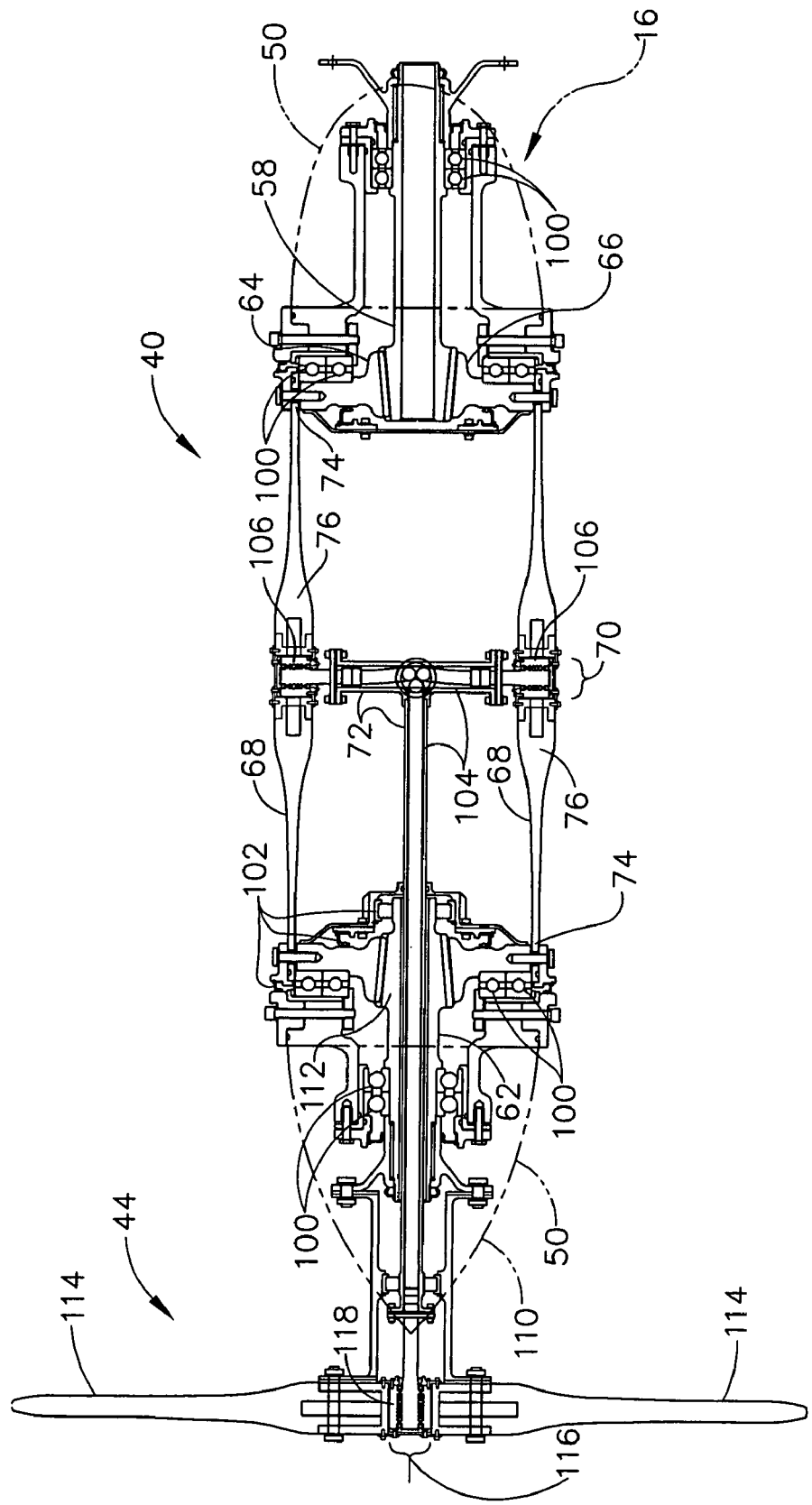
FIG. 5 is a partial cross section of the aircraft flight control system taken along line 5-5 of FIG. 2.
Figure 6:
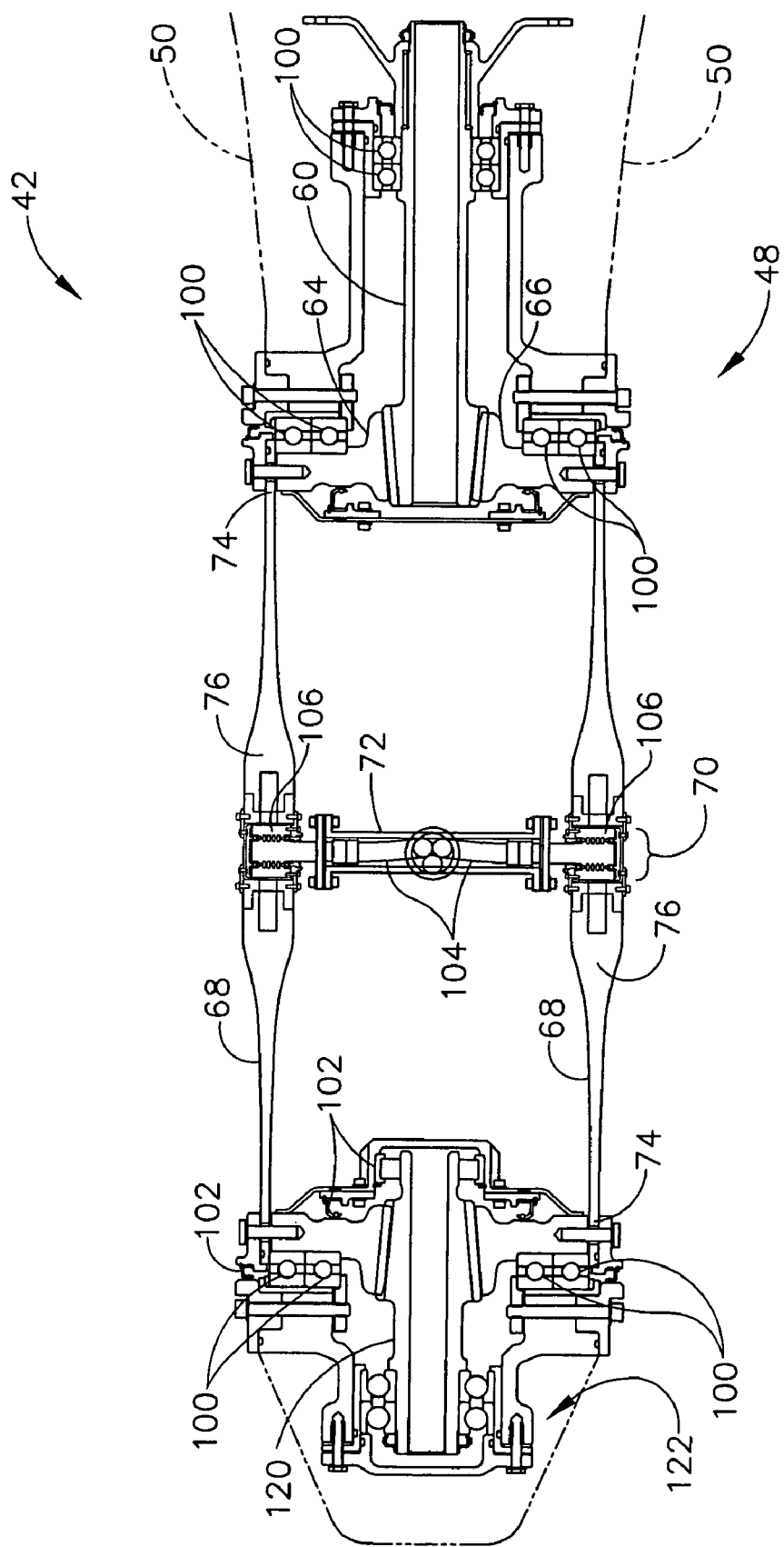
FIG. 6 is a partial cross section of the aircraft flight control system taken along line 6-6 of FIG. 2.

In the embodiment shown in FIGS. 1 and 2, the aircraft 10 has three counter-rotatable ducted fan sets, including two wing fans sets 40 and one nose fan set 42. The nose fan set 42 is disposed in the aircraft nose 48 adjacent the forward end 20 of the airframe 12. Because of their structure, the wing and nose fans 40, 42 are substantially inset, or low-profile. That is, the parts making up the fans 40, 42 are disposed completely within or substantially flush with a skin surface 50 of the aircraft 10, as shown in FIGS. 1, 5, and 6. In one embodiment (not shown), the aircraft has only one counter-rotatable ducted ring fan set, which is centered about a longitudinal axis 52 of the craft. In the embodiment having a single fan set, a fan shaft connects the ring fan set to the power plant. Although the fan sets 40, 42 are shown in stationary wing and nose applications, those skilled in the art will appreciate counter-rotatable fan sets can be used in other ways without departing from the scope of the present invention. For example, fan sets can be used as rotorcraft tail rotors, hybrid V/STOL jet lift fans, or small scale tilt-wing and tilt-rotor fans.

The power plant 46 may be any conventional type of motor or engine for producing torque without departing from the scope of the present invention. For example, the power plant 46 can be an internal combustion or gas turbine engine, an electric motor, a hydrogen fueled engine, or a hybrid motor. Although the power plant 46 may produce other amounts of torque without departing from the scope of the present invention, in one embodiment the power plant produces between about 1,200 in-lbs and about 6,300 in-lbs of torque. For electric or hybrid motors incorporating electric power, at least a portion of the power can be created using solar energy collected in solar panels (not shown) positioned on the surface 50 of the aircraft 10. The terms "motor" and "engine" are used interchangeably in the specification and claims to represent power plants for generating power with which to drive the aircraft 10.

The power plant 46 is operatively connected to a transfer gear box 54, which is mounted on the airframe 12, by a main torque shaft 56. The main torque shaft 56 transfers torque generated in the power plant 46 to the transfer gear box 54. The transfer gear box 54 transfers torque received from the main torque shaft 56 to the wing fan sets 40 and nose fan set 42 by way of wing torque shafts 58 and a nose torque shaft 60, respectively. The propellers 44 are powered by torque received from the wing fan sets 40 by way of propeller shafts 62.

Figure 3:
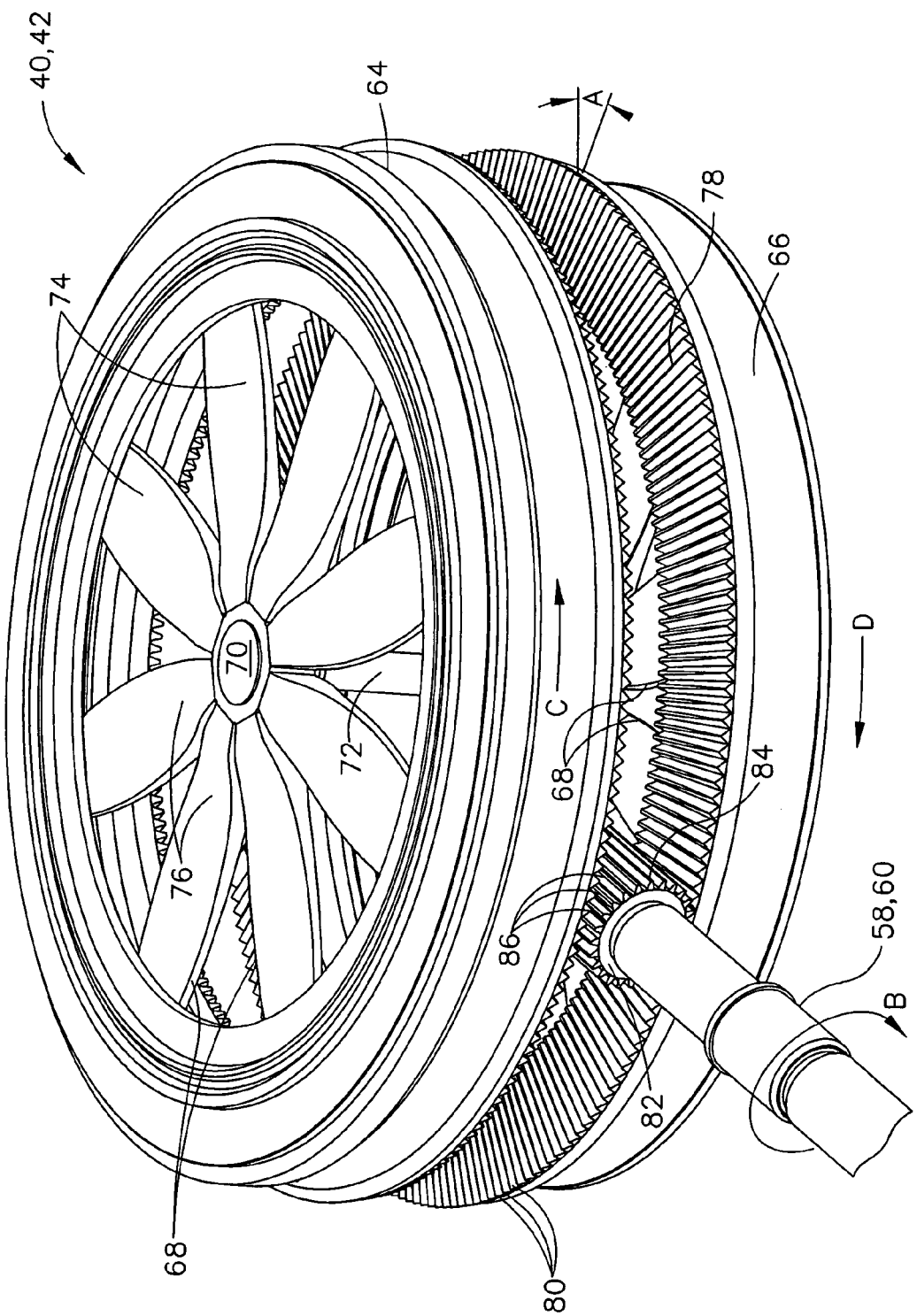
FIG. 3 is a perspective of a split-torque face gear system according to the present invention.

FIG. 3 schematically illustrates a typical fan set 40, 42 according to the present invention. The fan set 40, 42 comprises an upper face gear 64 and a lower face gear 66. The face gears 64, 66 are said to be in-line because their axes of rotation are colinear. Although dual opposing face gears 64, 66 are shown, a single face gear may be used instead without departing from the scope of the present invention. Although the face gears 64, 66 may be made of other materials without departing from the scope of the present invention, in one embodiment the face gears are made of a carburizing steel alloy. Gear types other than face gears can be used without departing from the scope of the present invention. For example, instead of face gears, bevel gears (not shown) can be used. However, face gears may be preferred because face gears can accommodate much larger reduction ratios than bevel gears and can provide a lower profile within the airframe than bevel gears. A plurality of fan blades 68 extend inward from each face gear 64, 66 to a central hub 70. A central conduit 72 extends between opposing hubs 70. The conduits 72 can contain, for example, supply lines (not shown in FIGS. 1-4) for supplying electrical signals to the blades 68. Each blade 68 extends between a tip 74 adjacent the face gears 64, 66 and a root 76 adjacent the hub 70. Because the blades 68 are connected to the gears 64, 66 at their tips 74, there is no need for a central driving shaft. Without a central driving shaft, the system is less complex, lighter, and more efficient due to decreased disruption of air flow through the fan set 40, 42. Although the blade tips 74 may travel at other speeds during operation without departing from the scope of the present invention, in one embodiment blade tip speeds for the propulsion devices 40, 42, 44 are between about 600 ft/s and about 800 ft/s. Each face gear 64, 66 has a face plane 78 and an angle A extending between the face plane and horizontal. Although the face gears 64, 66 may have other face plane angles A without departing from the scope of the present invention, in one embodiment each face gear has a face angle of between about 0° (i.e., the face plane is horizontal) and about 10°. Teeth 80 extend from each of the face planes 78. The teeth 80 can be any one of many conventional types without departing from the scope of the invention. For example, the teeth 80 can be straight, spiral angle, or hypoid.

The upper and lower face gears 64, 66 are driven by a floating input shaft 58, 60, which drives a corresponding pinion 82. Although the pinion 82 may be made of other materials without departing from the scope of the present invention, in one embodiment the pinion is made of a carburizing steel alloy. Although the shaft 58, 60 is shown substantially parallel to the rotation plane of the face gears 64, 66 (i.e., parallel to horizontal), the shaft may be angled from the rotation plane of the gears without departing from the scope of the present invention. For example, the shaft 58, 60 may be angled from horizontal by an angle between about −30° (i.e., downward from horizontal) and about 20°. Thus, the pinion 82 and face gears 64, 66 translate torque about a first axis (i.e., that of the corresponding shaft) to torque about a second axis (i.e., that of the face gears) that is perpendicular or angled to some degree from perpendicular with the first. The ability to angle the input pinion 82 with respect to the rotational plane of the face gears 64, 66 is another benefit of using face gears over bevel gears. The pinion 82 includes a contact surface 84 having teeth 86 corresponding to the face gear teeth 80. The pinion contact surface 84 is angled with respect to horizontal to correspond with the angle A of the face planes 78. For example, if the face planes 78 are offset from horizontal by an angle A of about 5°, then in one embodiment the pinion contact surface 84 is correspondingly offset from horizontal by about 5°. The input pinion 82 drives the opposing face gears 64, 66 in opposite directions during operation. For example, when the input pinion 82 rotates in direction B as shown in FIG. 3, the upper face gear 64 rotates in direction C and the lower face gear 66 rotates in direction D. For this reason, the fan gear set 40, 42 counter rotates. During operation, about one-half of the torque supplied by the input pinion 82 to the face gear set 40, 42 is transferred to each of the upper and lower face gears 64, 66. For this reason, the drive system is referred to as a split-torque drive system.

Split-torque drive systems are lighter and more space efficient than traditional systems because of their load bearing and structural qualities. Specifically, less material is required to form the gearing because each gear mesh encounters about one-half of the load that a single gear mesh would encounter. The decreased load allows the gearing to have less material per gear. Also, the structural advantages from having dual, in-line, face gears requires less material and structure than traditional drive systems. For example, some traditional drive systems comprise two, three, or more stages of gears to reduce and transfer the torque. In contrast, the split-torque system reduces and transfers the torque from the input shaft and pinion to the face gears in one step. Further, the load division and high up-front speed reduction of the split-torque face gear system afford quieter vehicle operation.

Figure 4:
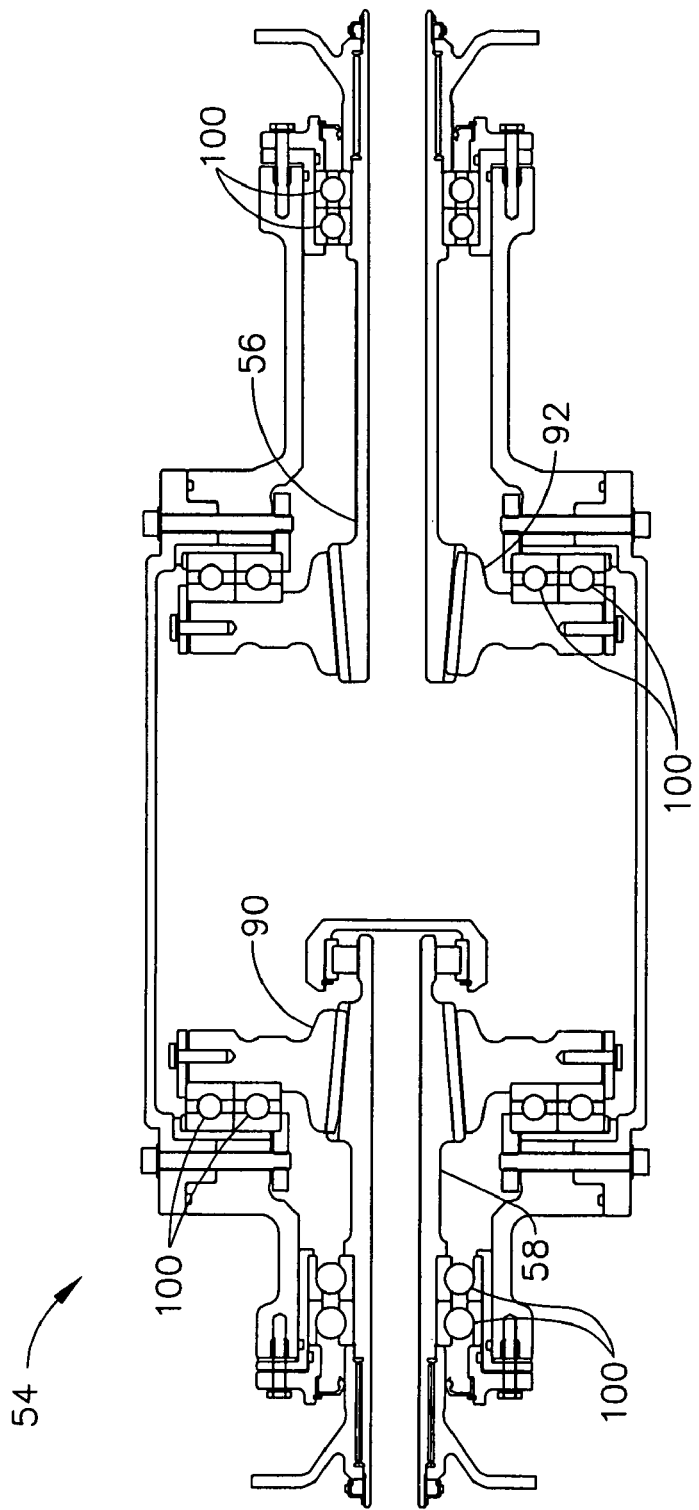
FIG. 4 is a partial cross section of the aircraft flight control system taken along line 4-4 of FIG. 2.

As shown in FIG. 4, the transfer gear box 54 comprises a face gear set having an upper face gear 90 and a lower face gear 92. The torque delivered to the transfer gear box 54 from the main torque shaft 56 is evenly distributed to the face gears 90, 92. Movement of rotating parts, such as the main torque shaft 56 and the upper and lower face gears 90, 92, can be facilitated by bearings 100, oil (not shown), or other conventional lubricants or implements for reducing friction between parts moving relative to each other. Torque received by the transfer gear box 54 is transferred to the wing fan sets 40 by the wing torque shafts 58 and to the nose fan set 42 by the nose torque shaft 60. The amount of torque transferred from the power plant 46 to the propulsion devices 40, 42, 44 is substantially conserved. For example, if the nose fan 42 was disengaged from the transfer gear box 54 by a clutch (not shown), about one-half of the torque sent to the transfer gear box would be transferred to each wing fan 40. Further, in this example, if the nose fan 42 was re-engaged and the torque transferred to it was increased up from zero toward about one-third of the torque produced by the power plant 46, the torque transferred to each of the wing fans 40 would decrease from about one-half of the total torque to about one-third of the total torque. Many different torque distributions among the propulsion devices 40, 42, 44 are possible.

FIG. 5 shows one of the ducted wing fan sets 40. The ducted wing fan set 40 includes an upper ring face gear 64, a lower ring face gear 66, and a plurality of fan blades 68 extending inward from the upper and lower face gears to a central fan hub 70. Although the wing fan set blades 68 may have other lengths without departing from the scope of the present invention, in one embodiment each wing fan blade has a length of between about 6 inches and about 36 inches. When the wing torque shaft 58 rotates, torque is transferred from the shaft to the upper and lower face gears 64, 66, causing them to rotate in opposite directions. The fan sets 40 can contain oil retainers 102 for holding oil (not shown) used to facilitate smooth operation of moving parts. As described above, because the fan blades 68 are connected to the face gears 64, 66 at their tips 74, there is no need for a central driving shaft. Instead, conduits 72 containing supply lines 104 for supplying electrical signals to the blades 68 can be used. Slip rings 106 are positioned within the fan hubs 70 for transmitting electrical signals from the stationary supply lines 104 to the rotatable blades 68.

Propellers 44 corresponding to the wing fan sets 40 are rotatably mounted on the airframe 12 for propelling the aircraft 10 in a generally forward direction during operation. Specifically, the propellers 44 are positioned at aft edges 110 of the wings 16 and operatively connected to the corresponding wing fan sets 40 by the propeller shafts 62. The propeller shafts 62 have pinions 112 that engage the upper and lower face gears 64, 66 of the wing fan sets 40. As the face gears 64, 66 of the wing fan set 40 rotate in opposite directions, the propeller pinion 112 is rotated, which in turn rotates the propeller 44. Each propeller 44 includes propeller blades 114 extending radially outward from a propeller hub 116. Although the propeller blades 114 may have other lengths without departing from the scope of the present invention, in one embodiment the propeller blades have a length of between about 8 inches and about 42 inches. Slip rings 118 are positioned within the propeller hubs 116 for transmitting electrical signals from the stationary supply lines 104 to the rotatable propeller blades 114. Although not shown, other structures for providing forward and/or rearward thrust to the aircraft 10 may be provided without departing from the scope of the present invention. For example, a jet thruster or additional propeller may be provided adjacent the aft end 22 of aircraft 10 along the longitudinal axis 52. The terms "propeller" and "fan" are used interchangeably in the specification and claims and do not designate blades having particular aspect ratios. Although the propeller 44 may have other numbers of blades without departing from the scope of the present invention, in one embodiment the propeller has eight blades.

FIG. 6 shows the nose fan set 42, which includes upper and lower face gears 64, 66 that receive torque from the nose torque shaft 60 during operation. Nose fan blades 68 extend inward from their tips 74 connected to the face gears 64, 66 to a central hub 70. Although the nose fan blades 68 may have other lengths without departing from the scope of the present invention, in one embodiment each nose fan blade has a length of between about 3 inches and about 22 inches. A conventional central drive shaft is replaced by a conduit 72 containing supply lines 104 for supplying electrical signals to the blades 68. Slip rings 106 are positioned within the hubs 70 for transmitting electrical signals from the stationary supply lines 104 to the rotatable nose fan blades 68. As the nose torque shaft 60 rotates, the upper and lower nose face gears 64, 66 rotate in opposite directions. A nose output shaft 120 is operatively connected to the upper and lower nose face gears 64, 66. The nose output shaft 120 is operatively connected to a nose idler gear 122. The nose idler gear 122 may be used to ensure desired torque distribution within the aircraft 10. Drag on the nose idler gear 122 can be increased to effectively draw more torque from the transfer gear box 54 to the nose fan set 42 or reduced to effectively draw less torque from the transfer gear box to the nose fan set. When the nose fan set 42 effectively draws more torque, less is distributed from the transfer gear box 54 to the wing fan sets 40 and propellers 44 due to the aforementioned conservation of torque within the flight control system. Conversely, when the nose fan set 42 effectively draws less torque from the transfer gear box 54, more torque is distributed from the transfer gear box to the wing fan sets 40 and propellers 44. The nose idler gear 122 can be controlled by an electrical signal sent to the idler from, for example, electrical lines (not shown) connected to the supply lines 104. Instead of an idler gear, the nose output shaft 120 may be operatively connected to other structures, such as an additional propeller (not shown) positioned at the forward end 20 of the aircraft 10, without departing from the scope of the present invention. Although not shown in the figures, idler gears can be operatively connected at other locations in the aircraft flight control system of the present invention. For example, idlers can be operatively connected to the wing fan sets 40, without departing from the scope of the present invention. To more dramatically affect the torque distribution within the aircraft 10, one or more clutches (not shown) can be provided at locations between the power plant 46 and the propulsion devices 40, 42, 44 for selectively engaging/disengaging the devices. When a clutch is fully actuated, no torque is transferred to the device on the other side of the clutch.

Aircraft 10 flight according to the present invention is primarily controlled, along with use of conventional flight control devices (e.g., ailerons 28, flaps 30, one or more elevators 32, and fins 34), by controlling the thrust produced by the various propulsion devices 40, 42, 44. The amounts of thrust created by the propulsion devices 40, 42, 44 can be changed by adjusting the rotational direction, pitch, and/or speed of the blades 68, 114. Blade pitch is measured with respect to the rotational plane of the respective fan or propeller. Blade pitch adjustment may be accomplished in a variety of ways without departing from the scope of the present invention. For example, pitch adjustment can be accomplished by fly-by-wire, swashplate, or hydraulic governor methods (not shown). Although the blades 68, 114 may be made of other materials without departing from the scope of the present invention, in one embodiment the blades are made of a shape memory alloy. Shape memory alloys are often referred to as "smart materials" because their structural characteristics vary in a predictable manner in response to an external force or change in environmental conditions. Particularly, smart materials can experience a solid state phase change, and accompanying shape change, or molecular rearrangement in response to a stimulus, such as heat, and return to the default phase and shape upon removal of the stimulus. Example smart materials include Ni—Ti (Nickel-Titanium), Cu—Zn—Al, and Cu—Al—Ni. Phase change of the smart materials results in geometric and active twist of the blades 68, 114. In one embodiment the blades 68, 114 are made of a composite matrix having embedded piezoelectric smart actuator fibers for thermo-electrically adjusting blade pitch. Actuating the piezoelectric fibers in the blades causes the blades to pitch. Desired pitch angles can be obtained by appropriate actuation of the piezoelectric fibers.

The fan blades 68 can be fixedly or movably connected to the respective upper gears 64 and lower gears 66 at their tips 74 without departing from the scope of the present invention. For example, in one embodiment, a pre-loaded torsion spring (not shown) connects the tips 74 of the fan blades 68 to the respective gears 64, 66 for allowing the tips to pitch with respect to the gears. Similarly, springs or other structures allowing relative movement can be used to attach the fan and propeller blades 68, 114 to the central hubs 70, 116 and/or slip rings 106, 118 without departing from the scope of the present invention.

The degree that a substantial portion of the blade surface is angled from the rotational plane of the applicable fan or propeller is a pitch angle. The blade surface of a blade adjusted to have no pitch (i.e., 0° pitch angle) is about parallel with the rotation plane of the fan or propeller. A blade adjusted to have no pitch angle is said to be flat or have flat pitch. A blade adjusted to have maximum pitch is angled at about 45° from the rotation plane. The blades can be adjusted to intermediate pitch positions where the pitch angles are between about 0° and about 45°. The blades can have an inherent, default, or non-actuated pitch angle. In one embodiment, the inherent pitch position is about halfway between flat and maximum pitch, or between about 21° and about 24°. From the inherent position, the blades 68, 114 can be actuated toward the flat or maximum pitch positions. One reason for having an inherent pitch angle about halfway between a maximum and minimum is it is easier with current blade material and control technology to adjust a blade having a 22.5° inherent angle within an operating pitch angle range from about 0° to about 45° (i.e., maximum pitch change from inherent of about 22.5° in either direction) than to adjust a blade having a 0° inherent pitch angle all the way to 45° (i.e., a maximum pitch change of about 45°).

The aircraft 10 further includes operational equipment, such as avionic equipment, navigation equipment, ordinance, and observation equipment (not shown), mounted on the airframe 12. The aircraft 10 can be used for manned or unmanned flight without departing from the scope of the present invention. Unmanned flight can be controlled remotely and/or pre-programmed.

The propulsion devices 40, 42, 44 can be selectively used instead of or in combination with traditional aircraft structures (e.g., ailerons 28, flaps 30, one or more elevators 32, and fins 34) to control yaw, pitch, and roll during full forward flight. During flight with a small or no forward velocity, such as during hovering, only the propulsion devices 40, 42, 44 can be used to control the vehicle because insufficient amounts of air are passing over the traditional structures to render them useful. To adjust aircraft pitch during forward flight, the nose fan 42 and the one or more elevators 32 can be used together or separately. Thrust produced by the nose fan 42 can be increased or decreased to achieve positive or negative pitch, respectively. To control roll during forward flight, the wing fan sets 40 and ailerons 28 can be used together or separately. To roll the aircraft 10 using the wing fans 40, thrust from one of the wing fan sets is increased relative to the thrust from the other. For example, the blade pitch of the left wing fan set can be increased while the blade pitch on the right wing fan set is unchanged or decreased. Increasing the blade pitch of a fan 40 or propeller 44 on one side of the aircraft 10 while decreasing the blade pitch of the mate fan or propeller on the opposite side of the vehicle by a corresponding amount is referred to as differential collective pitch control. Other control methods, such as cyclic control, can be used without departing from the scope of the present invention. To control aircraft yaw during forward flight, the propellers 44 and the rudder (not shown) can be used together or separately. Fins 34 provide additional yaw stability to the aircraft 10. To control yaw using the propellers 44, thrust from one of the propellers is increased relative to the thrust from the other. For example, the blade pitch of the left propeller can be increased while the blade pitch of the right propeller is unchanged or decreased. To control lift during flight, the nose fan 42, wing fans 40, and flaps 30 can be used individually or in some combination. To control drag, the propellers 44 and flaps 30 can be used separately or together. To increase drag using the propellers 44, the propeller blades 114 are adjusted toward flat pitch, causing the propellers to act as rotating disks, providing no thrust and inducing friction against aircraft 10 motion in the longitudinal direction of the craft.

Transitioning between hover and full forward flight modes can be accomplished by adjusting blade pitches, torque distribution within the flight control system, and traditional flight control components. For example, in full forward flight, the fan blades 68 of the wing and nose fans 40, 42 are adjusted to flat pitch while the propeller blades 114 are adjusted to a pitch greater than flat. In this way, the fan blades 68 provide no vertical thrust and minimum drag against forward travel. The drag produced by the fan sets 40, 42 is especially low because of their inset or low-profile disposition. When rotating fan blades 68 are pitched flat, the fans 40, 42 generally rotate non-drag creating discs. When the blades 68 are pitched to force air through the fans, the low-profile disposition of the fan sets 40, 42 has the additional benefit of improving air flow through the fan because the aerodynamic forces created by the fans are better channeled. To convert from full forward to hover flight mode, pitch of the fan blades 68 is increased above flat and pitch of the propeller blades 114 is decreased to flat. The flaps 30 can be used to add drag. As pitch of the fan blades 68 is increased, the counter-rotating fan sets 40, 42 provide an increasing amount of vertical thrust by forcing more air downward. Along with providing no forward thrust, substantially flat pitched propeller blades 114, in conjunction with the flaps 30 if used, provide induced drag, which, along with inherent drag produced by aircraft skin friction, acts to retard forward motion of the aircraft 10. To move the aircraft 10 upward or downward while hovering and for vertical take-off and landing, the fan blades 68 are adjusted further toward maximum or flat, respectively. More or less vertical thrust can also be created by increasing or decreasing the fan speeds. To convert from hover back to full forward mode, the fan blades 68 are adjusted toward flat and/or slowed, the propeller blades 114 are adjusted toward maximum and/or sped up, and the flaps 30 can be adjusted toward flush with the wing surface 50.

Various transitional flight modes can be performed by using combinations of fan and propeller pitch angles in conjunction with traditional control structures 28, 30, 32, 34. For example, operating all blades 68, 114 at inherent pitch angle, e.g., at about 22.5°, could cause the plane to simultaneously move forward and upward. As another example, the aircraft 10 can be controlled to move forward and downward, pitch while hovering, roll while hovering, yaw while hovering, fly forward with a marked craft pitch, or slow circle. Also, either by pitching the propeller blades 114 beyond flat to a negative pitch or reversing the direction of rotation of the propellers 44, the aircraft 10 can convert from hover to slow backward flight.

Vertical take-offs and landings are performed by using only vertical thrust (except a small amount of horizontal thrust may be required, e.g., to overcome a strong breeze). Vertical propulsion is accomplished by operating the wing and nose fan sets 40, 42 with blades 68 pitched greater than flat while the propellers 44 generally produce no thrust. Thrust from the propellers 44 can be kept at about zero by either sending little or no torque to the propellers, such as by disengaging the connection between the wing fans 40 and the propellers by a clutch (not shown), or by pitching the propeller blades 114 to 0°. For vertical take-offs, vertical thrust is gradually increased from zero to an amount sufficient to raise the aircraft 10 off the ground and to the desired altitude. Vertical thrust can be increased by increasing the pitch of the wing and nose fan blades 68 toward maximum pitch and/or increasing blade speed. The altitude achieved before forward motion is initiated during take-off is discretionary. For example, a user may commence forward propulsion very soon after the aircraft 10 has left the ground. For vertical landings, the aircraft is first transitioned to hover mode. Then, the amount of vertical thrust is gradually decreased until the aircraft 10 lands. Vertical thrust can be decreased by decreasing the pitch of the fan blades 68 toward flat pitch and/or decreasing blade speed. The amount of substantially full vertical descent in a vertical landing is discretionary. For example, a user may decrease forward speed and increase vertical thrust such that the forward speed becomes zero just before or almost exactly when the plane touches down.

Vehicles capable of short take-off and landing use a much shorter launch and landing strip (not shown) compared to traditional airplanes. For short-take offs, the aircraft 10 is moved forward by wheels (not shown) and/or the propellers 44. Thrust from the vertical fans 40, 42 can be increased from zero at any time before or after forward motion is commenced to achieve the desired take-off effect. The vertical thrust provided by the vertical fans 40, 42 is increased such that, with or without the aid of lift from air traveling under the wings 16 and against the elevator 32, depending on the forward speed of the aircraft 10 at departure from the landing strip, the aircraft leaves the ground before traveling far forward on the ground. For short landings, forward motion of the flying aircraft 10 is slowed and thrust from the vertical fans 40, 42 is increased as the aircraft 10 approaches the landing strip. When the aircraft 10 touches down, the amount of vertical thrust is sufficiently high to cushion the landing as desired and the forward thrust and speed is sufficiently low to allow the vehicle to stop in a short distance. Once on the landing strip, the aircraft 10 can be further slowed by, for example, pitching rotating propeller blades 114 further toward flat, applying brakes to the wheels (not shown), deploying the flaps 30 if not already deployed, using a parachute (not shown), and/or using reverse thrusters (not shown).

In one embodiment of the present invention, the control system is designed such that an increase in fan blade pitch is automatically accompanied by a decrease in propeller blade pitch. That is, when the propeller blades 114 are adjusted towards their maximum pitch, the fan blades 68 are adjusted toward flat pitch, and vice versa. One benefit of such inversely proportionate control of fan and propeller blade pitch is the reduction of the likelihood of aircraft stall during flight because as forward thrust is decreased, vertical thrust is increased, and vice versa. Notwithstanding use of clutches (not shown), the joined wing fan/propeller arrangement further guards against stall. Specifically, because the propellers 44 are driven by torque transferred from the wing fans 40, the amount of total torque utilized by the pairs 40/44 remains constant. That is, when the vertical fans 40 use more torque, a proportionately lower amount of torque is transferred to the propellers 44. The fans 40, 42 use more torque when the pitch of their fan blades is increased due to the increased resistance from air against the blades. Thus, in conjunction with the ability to control the pitch and speed of, and thus the thrust created by, the fan and propeller blades in inverse proportion to each other, the amount of torque utilized by the fans 40, 42 and propellers 44 will relate to each other inversely. Even if only the blade pitch of one of the fan sets 40, 42 and the propellers 44 were adjusted up or down, the torque utilized by the other would decrease or increase, respectively. Thus, the aircraft 10 is guarded from stalling because a decrease in blade pitch of and forward thrust from the propeller blades 114 is accompanied by an increase in the amount of torque to and thrust from the wing fans 40 and nose fan 42. Similarly, a decrease in blade pitch of and thrust from the wing fans 40 and/or the nose fan 42 is accompanied by an increase in the amount of torque to and forward thrust from the propellers 44.

Aircraft according to the present invention is generally less complex, lighter, less costly to make and maintain, and more reliable than traditional V/STOL aircraft. Further benefits of aircraft according to the present invention over most traditional V/STOL aircraft include improved maneuverability, payload allowance, flight range, and fuel mileage.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. An aircraft comprising:
    an airframe having a forward end, and an aft end opposite said forward end;
    a power plant mounted on the airframe;
    at least two propellers rotatably mounted on the airframe and powered by the power plant for moving the aircraft in a generally forward direction during operation of said propellers, each propeller having an axis of rotation that extends approximately parallel with a longitudinal axis extending between the forward and aft ends of the airframe;
    at least two counter-rotatable fans sets mounted on the airframe and powered by the power plant for providing upward lift to the aircraft during operation of said fan sets;
    wherein the airframe comprising a fuselage and at least two wings extending laterally from the fuselage;
    a nose is positioned at the forward end of the airframe;
    at least one of said propellers is positioned on each of said wings;
    at least one of said counter-rotatable lift fan sets is positioned on each of said wings;
    at least one of said counter-rotatable lift fan set is disposed in the nose; each of said propellers has a plurality of propeller blades; and each of said fans sets has a plurality of fan blades.

2. The aircraft as set forth in claim 1 further comprising at least one of avionic equipment, navigational equipment, ordinance, and observation equipment mounted on the airframe, and wherein the aircraft is adapted for unmanned flight.

3. The aircraft as set forth in claim 1 further comprising:
    a transfer gearbox mounted on the airframe;
    a main torque shaft operatively connecting the transfer gear box to the power plant for delivering torque to the gear box from the power plant;
    a wing torque shaft operatively connecting the transfer gear box to each of said lift fan sets mounted on the wings for delivering torque to the respective lift fan sets from the gear box;
    a nose torque shaft operatively connecting the transfer gear box to said lift fan set mounted in the nose for delivering torque to the respective lift fan set from the gear box; and
    a propeller shaft operatively connecting each of said lift fan sets mounted on the wings to the corresponding propeller for delivering torque to the respective propeller.

4. The aircraft as set forth in claim 1 further comprising at least one idler operatively connected to one of the lift fan sets for controlling torque distribution amongst the fan sets and propellers during operation.

5. The aircraft as set forth in claim 4 wherein the power plant is of a type selected from the group consisting of: an internal combustion engine, an electric motor, and a hybrid motor.

6. The aircraft as set forth in claim 1 further comprising wherein each of said fan blades has an adjustable pitch angle, each of said propeller blades has an adjustable pitch angle, and said aircraft further comprises a control system for controlling the pitch angles of the fan blades and the pitch angles of the propeller blades during operation.

7. The aircraft as set forth in claim 6 wherein the pitch angles of the propeller blades and the fan blades are adjustable between an angle of about 0° and 45° during operation.

8. The aircraft as set forth in claim 7 wherein the propeller blades and fan blades each comprise a shape memory alloy and are swept to an inherent pitch angle of between about 21° and 24°.

9. The aircraft as set forth in claim 7 wherein each of the propeller blades and each of the fan blades comprises a composite matrix having embedded piezoelectric smart actuator fibers.

10. An aircraft comprising:

an airframe having a forward end, and an aft end opposite said forward end; a power plant mounted on the airframe;

at least two ducted ring fans mounted on the airframe between the forward end and the aft end for providing lift to the aircraft;

a fan shaft connecting the power plant to at least one of said ducted ring fans to provide lift during use;

at least two propellers mounted on the airframe for providing forward thrust to the aircraft, the propellers having an axis of rotation that extends approximately parallel with a longitudinal axis extending between the forward and aft ends of the airframe;

a propeller shaft connecting the power plant to at one propeller for powering the propeller to provide thrust during use;

wherein the airframe comprising a fuselage and at least two wings extending laterally from the fuselage;

a nose is positioned at the forward end of the airframe;

at least one of said two propellers is positioned on at least one of said wings;

wherein said at least one of said ducted ring fans is a counter-rotatable lift fan, and at least one ducted ring fan is positioned on each of said wings; at least one of said ducted ring fans is disposed in the nose.

* * * * *